United States Patent [19]

Frenier

[11] Patent Number: 5,096,618
[45] Date of Patent: Mar. 17, 1992

[54] PROCESS AND COMPOSITION FOR INHIBITING HIGH-TEMPERATURE IRON AND STEEL CORROSION

[75] Inventor: Wayne W. Frenier, Tulsa, Okla.

[73] Assignee: Dowell Schlumberger Incorporated, Tulsa, Okla.

[21] Appl. No.: 390,797

[22] Filed: Aug. 8, 1989

Related U.S. Application Data

[63] Continuation of Ser. No. 13,603, Feb. 12, 1987, abandoned.

[51] Int. Cl.$^5$ ............................ C09K 3/00; C11D 7/00
[52] U.S. Cl. .................. 252/396; 252/8.553; 252/146; 252/392
[58] Field of Search ............ 252/396, 8.553, 146, 252/392

[56] References Cited

U.S. PATENT DOCUMENTS

| | | | |
|---|---|---|---|
| 3,077,453 | 2/1963 | Oakes | 252/147 |
| 3,107,221 | 10/1963 | Harrison et al. | 252/148 |
| 3,404,094 | 10/1968 | Keeney | 252/148 |
| 4,444,668 | 4/1984 | Walker | 252/8.55 |
| 4,552,658 | 6/1985 | Walker | 148/248 |
| 4,552,672 | 11/1985 | Walker | 252/8.55 |

OTHER PUBLICATIONS

Schmitt et al., *Werkstoffe und Korrosion*, vol. 36, pp. 273-278 (1985).
*Chemical Communications*, pp. 473-474 (1981).

*Primary Examiner*—Robert L. Stoll
*Assistant Examiner*—C. Harris
*Attorney, Agent, or Firm*—Stephen A. Littlefield

[57] ABSTRACT

A composition and method for inhibiting corrosion of iron and steel in the presence of aqueous acid at high temperatures, containing an alkenylphenone having the following structure:

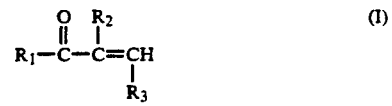

wherein
R$_1$ may be aryl of 6 to about 10 carbons, and R$_2$ and R$_3$ may be the same or different and each may be hydrogen, halogen, or aliphatic of about 3 to about 12 carbons, and R$_2$ may also be alkanol, ether, or aryl of 6 to about 10 carbons, provided that the total number of carbons in said alkenylphenone does not exceed 16, and
a substituted 1-azanaphthalene of the structure:

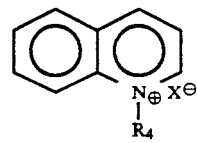

wherein R$_4$ is alkyl of about 4 to about 16 carbons, or alkylaryl of about 7 to about 20 carbons, and X is chloro or bromo.

34 Claims, No Drawings

PROCESS AND COMPOSITION FOR INHIBITING HIGH-TEMPERATURE IRON AND STEEL CORROSION

This is a continuation of copending application Ser. No. 07/013,603 filed on 2/12/87, now abandoned.

CROSS-REFERENCE TO RELATED APPLICATION

This invention is related to the subject matter of our prior application, Ser. No. 06/765,890 filed Aug. 14, 1985, now abandoned, the entire specification of which is incorporated by reference.

BACKGROUND OF THE INVENTION

1. Field of the Invention

The present invention relates to a new and useful class of corrosion inhibitors, and a process of using them. More particularly, the present invention concerns novel compositions of matter which reduce the attack of aqueous acid solutions on ferrous metals at high temperatures, and a process of using them.

2. Technology Review

In the exploration and recovery of oil from underground fields, it is common to "acidize" both new and producing wells with aqueous solutions of strong acids. Various inhibitors for preventing the attack of acids on ferrous metals have been proposed. Of the many inhibitors especially designed to prevent acid attack on the well casings, very few provide satisfactory protection at high temperatures. Arsenic and/or various arsenic compounds were used as corrosion inhibitors, despite their toxic effect. The toxic nature of arsenic and its compounds, and their adverse effect on catalysts used in petroleum refineries, have caused an extensive search for new corrosion inhibitors.

U.S. Pat. No. 4,028,268 discloses specific high-temperature corrosion inhibitors comprising a quaternized derivative of quinoline and a halomethylated polycyclic compound, an acetylenic alcohol, a surface active agent, and a formic acid derivative. Inhibitors prepared from quinoline and aliphatic and single-ring aromatic compounds are surprisingly less effective (col. 9, lines 11 to 18).

U.S. Pat. No. 3,658,720 discloses corrosion inhibitors comprising at least two acetylenic alcohols, a quinoline quaternary compound, and an organic fluoride, which cooperate to reduce the corrosivity of corrosive acids.

Schmitt and Bedbur disclose a study by AC impedance measurements of pyridinium and quinolinium derivatives in an investigation of structural and electronic effects in acid inhibitors. *Werkstoffe und Korrosion*, volume 36, pages 273–278 (1985).

It would be desirable to have a corrosion inhibitor which is useful in a broader number of situations. For example, highly concentrated hydrochloric acid is often employed in oil well stimulation treatment, but its use can lead to severe corrosion problems, especially at high temperatures. Thus, it would be desirable to have a corrosion inhibitor composition which could inhibit the acid corrosion of ferrous metals even in the presence of concentrated hydrocholoric acid at high temperatures and which is compatible with a variety of additives, for example, surfactants.

SUMMARY OF THE INVENTION

The invention provides a composition and method for inhibiting the corrosion of iron and steel in the presence of aqueous acid at high temperatures, especially concentrated hydrochloric acid at temperatures above about 100° C. The composition and method comprises adding to the acid an effective corrosion-inhibiting amount of an alkenylphenone and an N-substituted quinoline. The alkenylphenone has the following structure:

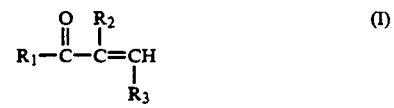

wherein $R_1$ may be unsubstituted or inertly substituted aryl of 6 to about 10 carbons; and $R_2$ and $R_3$ may be the same or different and each be hydrogen, halogen, or an unsubstituted or inertly substituted aliphatic of about 3 to about 12 carbons. $R_2$ may also be an alkanol, an ether, or an unsubstituted or inertly substituted aryl of 6 to about 10 carbons. The total number of carbon atoms in the compound (I) should not exceed 16. Inert substituents by definition have no adverse effect on the corrosion inhibition of the corresponding unsubstituted alkenyphenone, and include, for example, lower alkyl (one to four carbons), halo, an ether, alkoxy, or nitro. The compositions of the present invention are formed by admixing an alkenylphenone of structure (I) and an N-substituted quinoline (1-azanaphthalene). The composition and method of the invention are surprisingly effective in inhibiting the corrosion of iron and steel over a broad range of hydrochloric acid concentration at high temperatures.

It is an object of the invention to provide an improved composition for inhibiting iron and steel corrosion caused by a corrosive aqueous fluid, comprising an aqueous acid, an alkenylphenone of structure (I), and an N-substituted quinoline.

It is another object of the invention to provide an improved method for inhibiting iron and steel corrosion caused by a corrosive aqueous fluid, comprising mixing a compound which in aqueous acid forms an effective corrosion-inhibiting amount of an alkenylphenone of structure (I), and an N-substituted quinoline, together with said corrosive aqueous fluid.

It is an advantage of the invention that the improved composition is surprisingly effective in inhibiting the corrosion of iron and steel over a broad range of acid concentrations at high temperatures.

It is another advantage of the invention that the improved method for inhibiting corrosion is especially effective in highly concentrated aqueous acid solutions at high temperatures.

It is a feature of the invention that compounds with diverse structures will form, in aqueous acid, an alkenylphenone of the structure (I), which are admixed with a N-substituted quinoline.

It is another feature of the invention that compounds of the structure

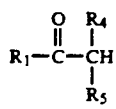 (II)

in aqueous acid form an alkenylphenone, which is admixed with a N-substituted quinoline. In compounds of structure (II), $R_4$ is an ether or alcohol of 0 to 8 carbon atoms in length; and $R_5$ is hydrogen, or an alkyl, alkenyl, alkynyl, cycloaliphatic or aryl group of 0 to 8 carbon atoms in length.

It is yet another feature of the invention that compounds of the structure

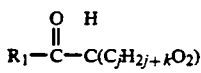

in aqueous acid form an alkenylphenone, which is admixed with an N-substituted quinoline. In compounds of structure (III), (j) is an integer from 2 to 8, and (k) is an integer from 0 to 2.

DETAILED DESCRIPTION OF THE INVENTION

The corrosion inhibitors of the present invention may be formed in either of two ways: (a) the direct addition of an alkenylphenone to the corrosive aqueous fluid, together with an N-substituted quinoline; or (b) the addition of a precursor of an alkenylphenone which interacts with a corrosive aqueous acid fluid to form an alkenylphenone in the presence of an N-substituted quinoline. Examples of alkenylphenones include:

(i) 2-benzoyl-3-hydroxy-1-propene

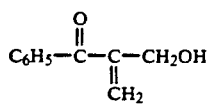

(ii) 2-benzoyl-3-methoxy-1-propene

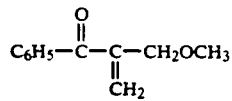

Precursors of alkenylphenones may take a variety of forms. Examples include:

(i) 5-benzoyl-1,3-dioxane

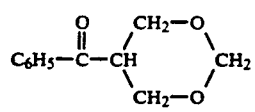

(ii) 2-benzoyl-1,3-dimethoxy-propane

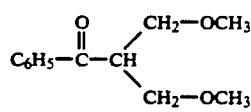

(iii) 3-hydroxy-1-phenyl-1-propanone

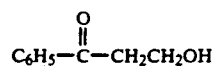

In 15% HCl at 65° C., (i) and (ii) form

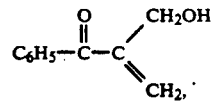

while (iii) forms

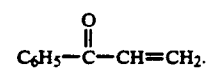

The corrosion inhibitors of the present invention may contain more than one precursor of an alkenylphenone. For example, the corrosion inhibitors of the present invention may include a mixture of precursors, including an alpha-hydroxy vinylidene compound and a hydroxy ketone, preferably together with a surfactant. The alpha-hydroxy vinylidene compound has the form

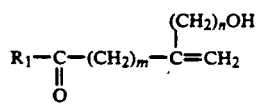

where $R_1$ may be an aryl hydrocarbon or inertly substituted aryl hydrocarbon: m and n must each be less than 5, and the total number of carbons in the compound should be 16 or less. A preferred example of an alpha-hydroxy vinylidene compound is 2-benzoyl-3-hydroxy-1-propene.

The hydroxy ketone has the form

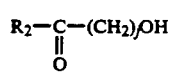

where $R_2$ may be an aryl hydrocarbon or inertly substituted aryl hydrocarbon. The value of j must be less than 5, and the compound should contain no more than 16 carbon atoms. A preferred example of a hydroxy ketone is 3-hydroxy-1-phenyl-1-propanone.

The compositions of the present invention comprise an alkenylphenone of the structure (I) and an N-substituted quinoline (1-azanaphthalene). N-substituted quinolines are usually called quinoliniums. Suitable quinoliniums include quinolinium salts of the structure:

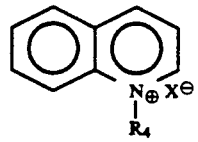

wherein $R_4$ is unsubstituted or inertly substituted alkyl of about 4 to about 16 carbons, or unsubstituted or inertly substituted alkylaryl of about 7 to about 20 carbons. Inert substituents are defined as having no adverse effect on the corrosion inhibition of the corresponding unsubstituted N-alkyl or N-alkylaryl quinolinium salts. X may be any compatible anion, preferably a halide such as Cl⁻ or Br⁻. A preferred quinolinium salt is 1-(α-naphthylmethyl)-quinolinium chloride.

Quinoline may be replaced by a similar or larger fused-ring system, such as isoquinoline (2-azanaphthalene), acridine (9-azaanthracene), phenanthridine (3,4-benzoquinoline), β-naphthoquinoline (5,6-benzoquinoline), or α-naphthoquinoline (7,8-benzoquinoline).

In addition to an alkenylphenone or a precursor of alkenylphenone, and an N-substituted quinoline which may have surface active properties, the composition may also contain an additional surfactant in an amount from 0 to about 2% by weight, based on the weight of the entire composition. The additional surfactant may be chosen from nonionic, cationic, anionic or amphoteric surface active agents. An example of a nonionic surface active agent is "THEO," an adduct of trimethyl-1-heptanol with 7 moles of ethylene oxide. An example of a cationic surface active agent is "DDPB," dodecylpyridinium bromide. An example of an anionic surface active agent is disodium 4-decylated oxydibenzenesulfonate. An example of an amphoteric surface active agent is coco beta-amino propionate.

The composition preferably includes an inhibitor aid such as an aliphatic acid or a halide salt, or mixtures thereof. The aliphatic acid of 1 to about 5 carbons may be saturated or unsaturated, for example, propionic acid or propiolic acid. The aliphatic acid may also be unsubstituted or halo-substituted, for example, acetic acid or chloroacetic acid. Mixtures of aliphatic acids may also be used as an inhibitor aid. Iodides are preferred halide salts, for example, KI, NaI, or HI. Mixtures of halide salts may also be used as an inhibitor aid.

Finally, the compositions of the invention include at least one of the following:

(1) Non-oxidizing mineral or organic acids, for example, hydrochloric acid, hydrofluoric acid, sulfuric acid, phosphoric acid, formic acid, acetic acid, citric acid, and mixtures thereof. The acid solutions may optionally contain chelating agents, such as EDTA. The concentration of a non-oxidizing mineral or organic acid in the composition of the present invention may vary from about 0.1 to about 35% by weight, based on the entire weight of the composition.

(2) An alkaline chelating agent, such as the ammonium salts of EDTA, HEDTA and DPTA. Alkaline chelating agents may be present in the composition of the present invention in an amount from about 0.1 to about 15% by weight, based on the weight of the entire composition.

(3) Salt solutions, such as solutions of sodium chloride, potassium chloride, calcium chloride, calcium bromide, zinc bromide, and mixtures thereof. Concentrations of salt solutions in the compositions of the present invention may vary from about 0.1% by weight to saturation, based on the weight of the entire composition.

(4) A salt solution, as described above, may be mixed with an acid gas, such as carbon dioxide or hydrogen sulfide, and/or hydrocarbons such as mineral oil, crude oil, or refined hydrocarbon products.

The amount of an alkenylphenone in the composition of the present invention may vary from about 0.1% to about 2% by weight, based on the weight of the entire composition. The amount of substituted or unsubstituted quinoline in the composition may also vary from about 0.1% to about 2% by weight, based on the weight of the entire composition. If present, the amount of inhibitor aid in the composition may be up to 10% by weight, based on the weight of the entire composition. The compositions of the present invention may be used for acidizing hydrocarbon-producing agents, cleaning metal, or completing oil and gas wells.

The present invention also includes a process for inhibiting the corrosion of iron and steel caused by corrosive aqueous solutions, especially concentrated hydrochloric acid at temperatures above about 100° C. The process is performed by introducing an effective corrosion-inhibiting amount of an alkenylphenone or an alkenylphenone precursor and a substituted or unsubstituted quinoline into a corrosive aqueous acid. The aqueous solution may contain hydrochloric acid, hydrofluoric acid, hydrobromic acid, sulfuric acid, phosphoric acid, ammoniated ethylenediaminetetraacetic acid (EDTA), hydroxyethylethylenediaminetriacetic acid (HEDTA), or various organic acids such as formic, acetic, citric, or mixtures thereof. As discussed above, the alkenylphenone precursor can be selected from any material which generates structure (I) when brought into contact with an aqueous fluid. In many cases, the inhibition of the present process is enhanced by the addition of from about 0.01 to about 5% by weight, compared to the weight of the entire composition, of a surfactant, selected from the surface active agents discussed above. The process of the present invention is normally practiced from about 20° C. to about 200° C., but is especially useful at temperatures above about 100° C. In the process of the present invention, the inhibitor composition is usually about 0.1 to about 5% by weight compared to weight of aqueous fluid. The total amount of inhibitor compositions used in the process will depend on the corrosive aqueous acid, its temperature, and the intended time of contact. The ratio of surfactant to inhibitor composition will depend on the corrosive aqueous fluid and the water solubility of the inhibitor composition. The exact amounts are determined using the test methods described in the examples below.

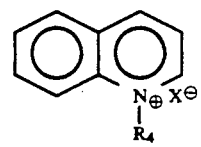

As used hereinafter, the abbreviation "quat" refers to N-substituted quinoliniums and pyridiniums in which the substituted nitrogen atom is pentavalent, as in the compound illustrated above. These compounds are formally analogous to quaternary ammonium compounds, from which the abbreviation is derived.

EXPERIMENT 1

Preparation of Quinoliniums

Quinolinium and pyridinium compounds were prepared by heating equimolar amounts of quinoline or pyridine with a chloro- or bromoalkyl of about 4 to about 10 carbons, or a chloro- or bromoalkylaryl of about 7 to about 20 carbons, to a temperature up to about 125° C. in about 30% aqueous alcohol. The reaction product was analyzed for free halide, and used without further purification.

For example, 50 grams of quinoline (Aldrich, 98%) (0.38 moles) and 68 grams of chloromethylnaphthalene (Aldrich) (0.38 moles) were mixed in 50 ml of isopropyl alcohol and refluxed for 6 hours at 95° C. The reaction product was analyzed for [Cl−]. For complete reaction the (theoretical) amount of [Cl−] is 8.3 weight percent; the amount of [Cl−] measured is 8.5 weight percent. The concentration of 1-methylnaphthal-1-azanaphthalene is 70 weight percent.

EXAMPLE 1

Quinoliniums and pyridiniums made generally as in Experiment 1 were tested with the alkenylphenone described below at 65° C. for 24 hours. A cleaned, weighed J-55 coupon (25 cm²) was hung from a glass hook in a 120 ml jar containing 100 ml HCl and the test inhibitors which were added based on the calculated weight of the quat. In 15% HCl, 0.2 g of alkenylphenone was used with 0.05 g of the quat, while, in 28% HCl, 0.4 g of alkenylphenone and 0.1 g of the components were used. The jar was then placed in a water bath set at 65° C. for 24 hours. At the end of the test, the coupons were removed, cleaned in acetone, and reweighed. All corrosion rates are expressed as grams/square centimeter of weight-loss for the time period of the test. Pyridiniums and quinoliniums of similar structure are compared in Tables I and II. Generally, the quinoliniums give better corrosion rates than the comparable pyridinium, especially in 28% HCl.

The alkenylphenone mentioned above, and in the other examples, and referred to as PK in the Tables, is prepared by the following procedure. 180 g acetophenone, 90 g paraformaldehyde, 300 mL methanol and 2.5 g $K_2CO_3$ are heated at 95° C. in a stirred Parr bomb for 6 hours. After bringing the pH to 5.0 with a small amount of HCl, the excess methanol is removed using a rotary evaporator. The solution is vacuum distilled at 1-2 Torr, and the fraction removed at 100°-140° C. is collected. This fraction consists of a small amount of acetophenone, plus dimethoxybenzoyl propane and methoxy benzoyl propene as major components.

TABLE I

| PYRIDINIUMS WITH ALKENYLPHENONE (PK) 65° C. FOR J 55 24 HOURS | | |
|---|---|---|
| | 15% HCl .05/.2 PK | 28% HCl .1/.4 PK |
| PYRIDINIUM | RATE (gm./sq. cm.) | |
| C10 Br | .003 | .008 |
| C14 Br | .005 | .008 |
| CH₂-NAPTH Cl | .003 | .006 |
| CH₂-PH-Cl Cl | .012 | .008 |

TABLE II

| QUINOLINIUMS WITH ALKENYLPHENONE (PK) 65° C. FOR J 55 24 HOURS | | |
|---|---|---|
| | 15% HCl .05/.2 PK | 28% HCl .1/.4 PK |
| QUINOLINIUM | RATE (gm./sq. cm.) | |
| C10 Br | .003 | .004 |
| C14 Br | .003 | .005 |
| CH₂-PH-Cl Cl | .005 | .003 |
| CH₂-NAPTH Cl | .003 | .003 |

EXAMPLE 2

Tests were conducted in a high pressure autoclave that held 20 120 ml. bottles and was filled with mineral oil to provide hydraulic pressure. One cleaned, weighed N-80 coupon (25 cm²) was hung in the bottle that was filled with 100 ml. of HCl, topped with mineral oil. 1 g. of alkenylphenone and 0.033 m/L of the quat was also present. At this temperature, KI was used as an inhibitor aid. After the autoclave was closed, it was pressurized to about 4500 psig and heated to 120° C., and held at that temperature for 6 hours. The bottles were agitated during the test with a "washing machine" action. After the test, the coupons were removed, cleaned and reweighed as above. The results of the comparisons of pyridiniums and quinoliniums are shown in Tables III and IV. With the exception of the C14 quats, the quinoliniums were superior. The 1-methylnaphthal-1-azanaphthalene (CH₂-NAPTH Cl) was especially effective in 28% HCl.

TABLE III

| PYRIDINIUMS WITH ALKENYLPHENONE (PK) 120° C. FOR N 80 6 HOURS 1% pk .003 MOLES PYR | | |
|---|---|---|
| | 15% HCl/1% KI | 28% HCl/2% KI |
| PYRIDINIUM | RATE (gm./sq. cm.) | |
| C10 Br | .009 | .021 |
| C14 Br | .011 | .028 |
| CH₂-NAPTH Cl | .005 | .019 |
| CH₂-PH-Cl Cl | .006 | .012 |

TABLE IV

| QUINOLINIUMS WITH ALKENYLPHENONE (PK) 120° C. FOR N 80 6 HOURS 1% PK .003 MOLES QUIN | | |
|---|---|---|
| | 15% HCl/1% KI | 28% HCl/2% KI |
| PYRIDINIUM | RATE (gm./sq. cm.) | |
| C10 Br | .010 | .024 |
| C14 B | .020 | .039 |
| CH₂PH-Cl Cl | .004 | .012 |
| CH₂-NAPTH Cl | .004 | .006 |

EXAMPLE 3

Similar tests were conducted in HCl at 150° C. for 6 hours for N-80 steel in the same manner as Example 2. The 1-methylnaphthal-1-azanaphthalene was compared with 1-methylnaphthal-azabenzene, A250 and Corexit 8504-1. Both KI and formic acid were used as aids. Table V demonstrates the superiority of the alkenylphenone and 1-methylnaphthal-1-azanaphthalene combination. The differences are especially significant in 28% HCl.

A 250 is a corrosion inhibitor product of Dowell Schlumberger Inc. of Tulsa, Okla. and is fully described in U.S. Pat. No. 4,493,775 by Coffey et al. Corexit 8504-1 is a corrosion inhibitor product of Exxon Chemical Company, a division of Exxon Corporation, of Houston, Tex.

TABLE V

| In 1 | In 2 | INHIBITOR AID | RATE, gm./sq. cm. |
|---|---|---|---|
| 150° C., 6 HOURS, 15% HCl, N80 | | | |
| QNMC[1], | 1.0 g | PK, .55 g | 1.75 KI g | .010 |
| QNMC[1], | 1.0 g | PK, .55 g | 3.5 Formic | .013 |
| PNMC[2], | 1.0 | PK, .55 | 1.75 KI | .02 |
| PNMC[2], | 1.0 | PK, .55 | 3.5 Formic | .02 |
| A250, | 1.5 | — | 1.75 KI | .13 |
| A250, | 1.5 | — | 3.5 Formic | .18 |
| C8504-1 | 1.5 | — | 1.75 KI | .13 |
| C8504-1 | 1.5 | — | 3.5 Formic | .03 |
| 150° C., 6 HOURS, 28% HCl, N80 | | | |
| QNMC, | 1.0 | PK, 1.0 g | 4.0 g KI | .029 |

TABLE V-continued

| In 1 | | In 2 | | INHIBITOR AID | | RATE, gm./sq. cm. |
|---|---|---|---|---|---|---|
| QNMC, | 1.0 g | PK, | 1.0 g | 8.0 | Formic | .03 |
| PNMC, | 1.0 | | 1.0 | 4.0 | KI | .17 |
| PNMC, | 1.0 | | 1.0 | 8.0 | Formic | .16 |
| A250, | 1.5 | | — | 4.0 | KI | .12 |
| A250, | 1.5 | | — | 8.0 | Formic | .29 |
| C8504-1 | 1.5 | | — | 4.0 | KI | .06 |
| C8504-1 | 1.5 | | — | 8.0 | Formic | .07 |

[1]Quinolinium Napthylmethyl Chloride [1-methylnaphthal-1-azanaphthalene]
[2]Pyridinium Napthylmethyl Chloride [1-methylnaphthal-aza-benzene]

EXAMPLE 5

The behavior of alkenylphenone (PK)/1-methylnaphthal-1-azanaphthalene (QQ) was tested at 149° C. in HCl for both KI and formic acid. From over 70 individual tests, equations were developed to predict the corrosion rates over a large design space. Table VI shows the predictive equations. The coefficients for the concentrations of the three components show that the quinolinium is the most important ingredient, but the inhibitor aid and the alkenylphenone also are very important.

TABLE VI

PREDICTIVE EQUATIONS
Log (Rate) = K + a[PK] + b[QQ] + c[AID] + D[HCl]

| K | a | b | c | d |
|---|---|---|---|---|
| AID = KI | | | | |
| −.1.122 | −.37 | −.74 | −.13 | .06 |
| AID = Formic Acid | | | | |
| −1.43 | −.28 | −.82 | −.19 | .07 |

It is understood that various other modifications will be apparent to and can readily be made by those skilled in the art without departing from the scope and spirit of the invention. Accordingly, it is not intended that the scope of the claims appended hereto be limited to the description as set forth herein, but rather that the claims be construed as encompassing all the features of patentable novelty which reside in the present invention, including all features which would be treated as equivalents thereof by those skilled in the art to which this invention pertains.

What is claimed is:

1. A composition, in the presence of an aqueous acid, comprising:

an alkenylphenone of the structure:

$$R_1-\overset{O}{\overset{\|}{C}}-\overset{R_2}{\overset{|}{C}}=\overset{}{\underset{R_3}{C}}H$$

wherein $R_1$ may be unsubstituted or inertly substituted aryl of 6 to about 10 carbons, and $R_2$ and $R_3$ may be the same or different and each may be hydrogen, halogen, or inertly substituted aliphatic of about 3 to about 12 unsubstituted or inertly substituted aryl of 6 to about 10 carbons, provided that the total number of carbons in said alkenylphenone does not exceed 16, and a substituted 1-azanaphthalene of the structure:

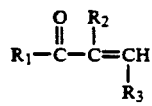

wherein $R_4$ is unsubstituted or inertly substituted alkyl of about 4 to about 16 carbons, or unsubstituted or inertly substituted alkylaryl of about 7 to about 20 carbons, and X is chloro or bromo, and an inhibitor aid selected from the group consisting of aliphatic acids of one to five carbons, halide salts, and mixtures thereof.

2. The composition set forth in claim 1, wherein $R_1$ is unsubstituted aryl.
3. The composition set forth in claim 2, wherein $R_1$ is unsubstituted phenyl.
4. The composition set forth in claim 1, wherein $R_3$ is hydrogen.
5. The composition set forth in claim 1, wherein $R_2$ is an alkanol of one to four carbons.
6. The composition set forth in claim 1, wherein $R_4$ is unsubstituted alkylaryl.
7. The composition set forth in claim 1, wherein $R_2$ is an ether of two to four carbons.
8. The composition set forth in claim 1, wherein $R_4$ is unsubstituted alkyl.
9. The composition set forth in claim 1, wherein $R_4$ is 1-methylnaphthal.
10. The composition set forth in claim 1, wherein said inhibitor aid includes at least one iodide salt.
11. The composition set forth in claim 1, including a surfactant selected from the group consisting of nonionic, cationic, anionic, and amphoteric surface active agents.
12. A composition, in the presence of a non-oxidizing mineral or organic acid, an alkaline chelating agent, or a salt solution, comprising:

an effective corrosion inhibiting amount of an alkenylphenone of the structure:

$$R_1-\overset{O}{\overset{\|}{C}}-\overset{R_2}{\overset{|}{C}}=\overset{}{\underset{R_3}{C}}H$$

wherein $R_1$ may be unsubstituted or inertly substituted aryl of 6 to about 10 carbon atoms, and $R_2$ and $R_3$ may be the same or different and each may be hydrogen, halogen, or inertly substituted aliphatic of about 3 to about 12 carbons, and $R_2$ may also be alkanol, ether, or unsubstituted or inertly substituted aryl of 6 to about 10 carbons, provided that the total number of carbons in said alpha-alkenylphenone does not exceed 16, and a substituted 1-azanaphthalene of the structure:

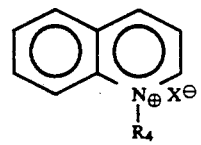

wherein $R_4$ is unsubstituted or inertly substituted alkyl of about 4 to about 16 carbons, or unsubstituted or inertly substituted alkylaryl of about 7 to about 20 carbons, and X is chloro or bromo.

13. The composition set forth in claim 12, including an alkaline chelating agent.

14. The composition set forth in claim 12 including a salt solution.

15. The composition set forth in claim 12, including an non-oxidizing mineral acid or organic acid.

16. The composition set forth in claim 14, including an acid gas and a hydrocarbon.

17. A composition comprising:
means for providing in the presence of an aqueous acid an alkenylphenone of the structure:

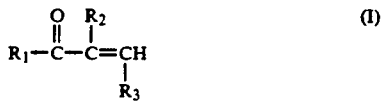

wherein $R_1$ may be unsubstituted or inertly substituted aryl of 6 to about 10 carbons, and $R_2$ and $R_3$ may be the same or different and each may be hydrogen, halogen, or inertly substituted aliphatic of about 3 to about 12 carbons, and $R_2$ may also be alkanol, ether, or unsubstituted or inertly substituted aryl of 6 to about 10 carbons, provided that the total number of carbons in said alkenylphenone does not exceed 16, a substituted 1-azanaphthalene of the structure:

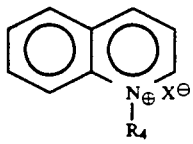

wherein $R_4$ is unsubstituted or inertly substituted alkyl of about 4 to about 16 carbons, or unsubstituted or inertly substituted alkylaryl of about 7 to about 20 carbons, and X is chloro or bromo, and an inhibitor aid selected from the group consisting of aliphatic acids of one to five carbons, halide salts, and mixtures thereof.

18. The composition set forth in claim 17, where $R_1$ is unsubstituted aryl.

19. The composition set forth in claim 18, wherein $R_1$ is unsubstituted phenyl.

20. The composition set forth in claim 17, wherein $R_3$ is hydrogen.

21. The composition set forth in claim 17, wherein $R_2$ is alkanol of one to four carbons.

22. The composition set forth in claim 17, where $R_2$ is an ether of two to four carbons.

23. The composition set forth in claim 17, wherein $R_4$ is unsubstituted alkylaryl.

24. The composition set forth in claim 17, wherein $R_4$ is 1-methylnaphthal.

25. The process for inhibiting corrosion of a ferrous surface in the presence of an aqueous solution, comprising:
contacting said ferrous surface with an aqueous solution containing an effective corrosion inhibiting amount of an alkenylphenone of the structure:

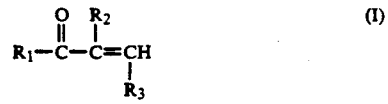

wherein $R_1$ may be unsubstituted or inertly substituted aryl of 6 to about 10 carbons, and $R_2$ and $R_3$ may be the same or different and each may be hydrogen, halogen, or inertly substituted aliphatic of about 3 to about 12 carbons, and $R_2$ may also be alkanol, ether, or unsubstituted or inertly substituted aryl of 6 to about 10 carbons, provided that the total number of carbons in said alkenylphenone does not exceed 16, and a substituted 1-azanaphthalene of the structure:

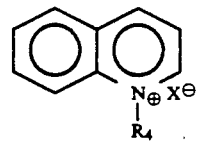

wherein $R_4$ is unsubstituted or inertly substituted alkyl of about 4 to about 16 carbons, or unsubstituted or inertly substituted alkylaryl of about 7 to about 20 carbons, and X is chloro or bromo.

26. The process for inhibiting corrosion set forth in claim 25, wherein said aqueous solution further contains a surfactant selected from the group consisting of nonionic, cationic, anionic, and amphoteric surface active agents.

27. The process for inhibiting corrosion set forth in claim 25, wherein $R_1$ is unsubstituted aryl.

28. The process for inhibiting corrosion set forth in claim 27, wherein $R_1$ is unsubstituted phenyl.

29. The process for inhibiting corrosion set forth in claim 25, wherein $R_3$ is hydrogen.

30. The process for inhibiting corrosion set forth in claim 25, wherein $R_2$ is an alkanol of one to four carbons.

31. The process for inhibiting corrosion set forth in claim 25, wherein $R_2$ is an ether of two to four carbons.

32. The process for inhibiting corrosion set forth in claim 25, wherein $R_4$ is unsubstituted alkylaryl.

33. The process for inhibiting corrosion set forth in claim 25, wherein $R_4$ is 1-methylnaphthal.

34. The process for inhibiting corrosion set forth in claim 25, wherein said aqueous solution further contains an inhibitor aid selected from the group consisting of aliphatic acids of one to five carbons, halide salts, and mixtures thereof.

* * * * *